United States Patent

Reik et al.

[11] Patent Number: 5,836,820
[45] Date of Patent: *Nov. 17, 1998

[54] APPARATUS FOR DAMPING TORSIONAL VIBRATIONS

[75] Inventors: Wolfgang Reik; Klaus Steeg, both of Bühl, Germany

[73] Assignee: Luk Lamellen Und Kupplungsbau GmbH, Bühl, Germany

[*] Notice: The term of this patent shall not extend beyond the expiration date of Pat. No. 5,785,599.

[21] Appl. No.: 335,575

[22] Filed: Nov. 7, 1994

[30] Foreign Application Priority Data

Nov. 5, 1993 [DE] Germany .......................... 43 37 723.8

[51] Int. Cl.⁶ ....................................................... F16D 3/12
[52] U.S. Cl. .......................................... 464/68; 192/106.2
[58] Field of Search ................................. 464/64, 66, 68; 192/106.2

[56] References Cited

U.S. PATENT DOCUMENTS

| | | | |
|---|---|---|---|
| 4,496,036 | 1/1985 | Loizeau | 464/68 X |
| 4,537,580 | 8/1985 | Loizeau et al. | 464/64 X |
| 4,580,672 | 4/1986 | Caray | 464/64 X |
| 4,618,048 | 10/1986 | Kobayashi | 464/68 |
| 4,767,380 | 8/1988 | Chasseguet et al. | 464/68 |
| 4,887,485 | 12/1989 | Kobayashi et al. | 464/68 X |
| 5,249,660 | 10/1993 | Feldhaus et al. | 464/68 X |
| 5,251,736 | 10/1993 | Jeppe et al. | 464/68 X |
| 5,257,687 | 11/1993 | Cooke | 464/68 X |

FOREIGN PATENT DOCUMENTS

| | | |
|---|---|---|
| 0 200 633 | 1/1989 | European Pat. Off. . |
| 2 411 999 | 7/1979 | France . |
| 886 694 | 7/1953 | Germany . |
| 897 783 | 10/1953 | Germany . |
| 28 14 240 | 10/1978 | Germany . |
| 25 08 878 | 3/1984 | Germany . |
| 36 01 903 | 8/1986 | Germany . |
| 41 37 113 | 5/1992 | Germany . |
| 42 39 610 | 5/1993 | Germany . |
| 34 33 909 | 8/1993 | Germany . |
| 43 04 778 | 8/1993 | Germany . |
| 1 492 982 | 11/1977 | United Kingdom . |

*Primary Examiner*—Donald P. Walsh
*Assistant Examiner*—William A. Rivera
*Attorney, Agent, or Firm*—Darby & Darby

[57] ABSTRACT

A clutch disc which serves to transmit torque between an axially movable pressure plate and a rotary counterpressure plate of a friction clutch in a motor vehicle has at least one damper including an input component having friction linings engageable by the pressure plate and the counterpressure plate when the clutch is engaged, an output component which is coaxial with and rotatable relative to the input component and can transmit torque to the input shaft of a variable-speed transmission in the vehicle, and energy storing means interposed between and opposing rotation of the input and output components relative to each other. The input and/or the output component includes at least one substantially disc-shaped torque transmitting member which is of one piece with a portion having several resilient tongues which are deformable in the direction of the common axis of the input and output components and form part of a friction generating device.

41 Claims, 3 Drawing Sheets

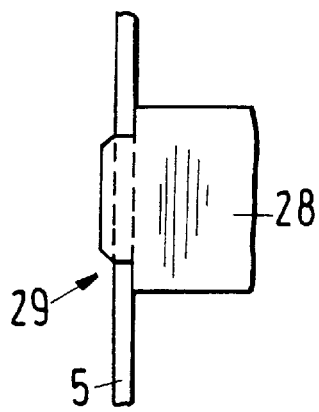
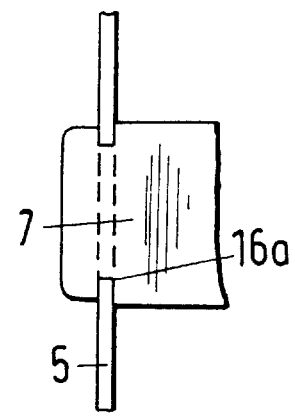
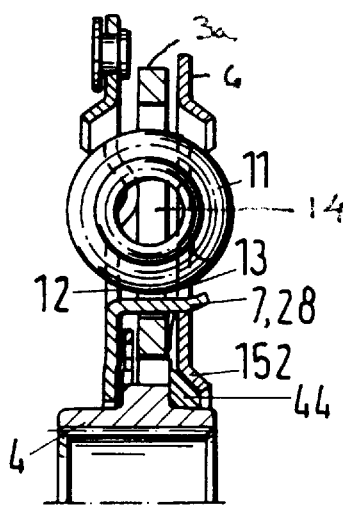
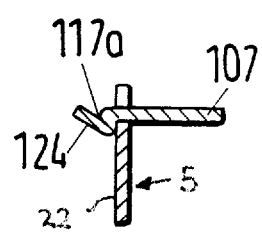
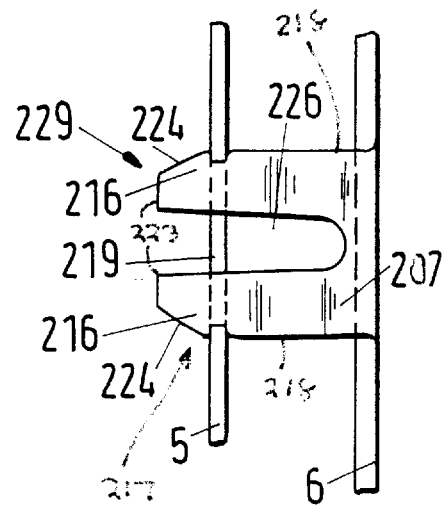

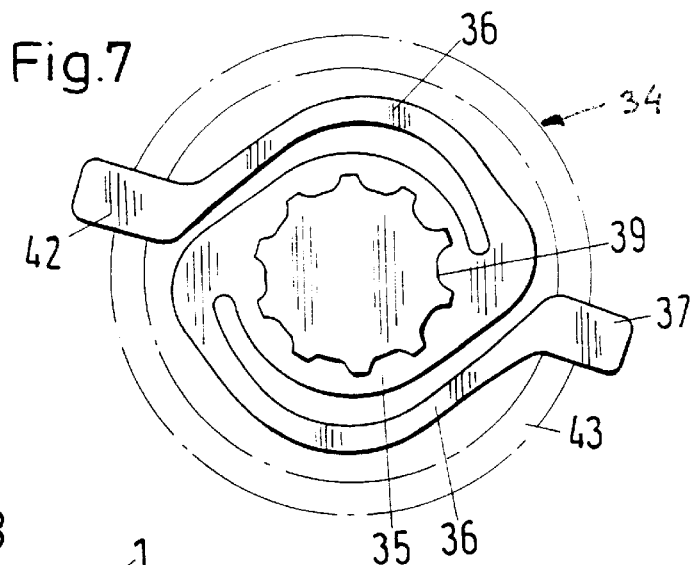
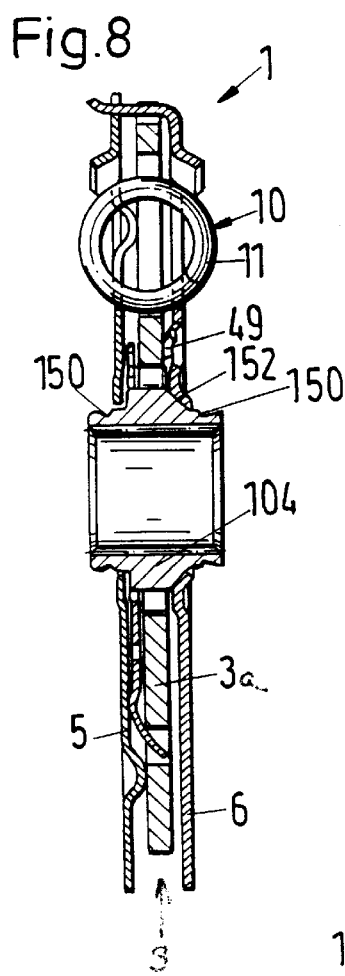
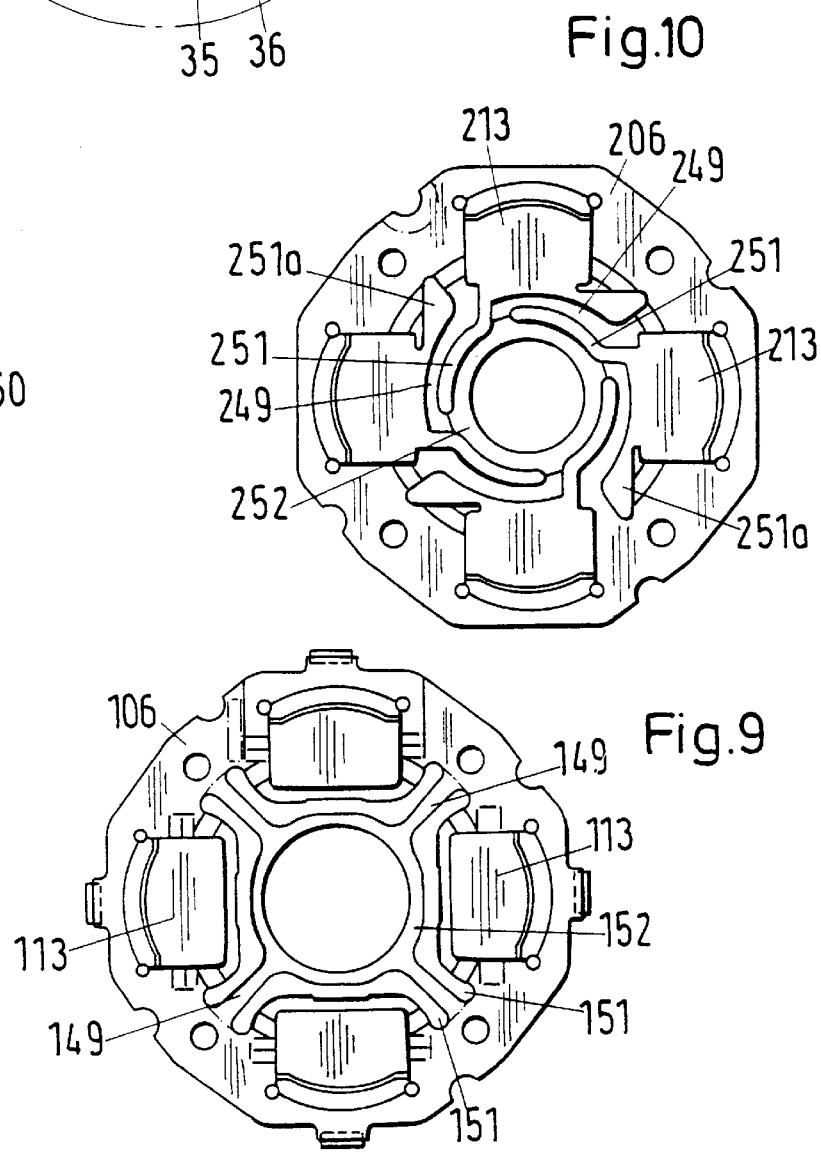

APPARATUS FOR DAMPING TORSIONAL VIBRATIONS

CROSS-REFERENCE TO RELATED APPLICATION

The specification of the present application is similar to that in the commonly owned co-pending patent application Ser. No. 08/335,577 filed Nov. 7, 1994 by Wolfgang Reik for "Torsional Vibration Damping Apparatus".

BACKGROUND OF THE INVENTION

The invention relates to improvements in apparatus for damping torsional vibrations, and more particularly to improvements in torsional vibration damping apparatus of the type having at least one damper including input and output components rotatable with and relative to each other and energy storing means serving to oppose rotation of the input and output components relative to each other.

Apparatus of the above-outlined character are disclosed, for example, in German Patent No. 34 33 909, in published German Patent Application No. 42 39 610 and in published German Patent Application No. 41 37 113.

Torsional vibration damping apparatus of the instant invention can be utilized in power trains between the prime movers and one or more driven units in motor vehicles, for example, between the rotary output element (such as a crankshaft or a camshaft) of an internal combustion engine and a variable-speed transmission in an automotive vehicle.

A drawback of presently known torsional vibration damping apparatus is that they are too bulky and too expensive. Furthermore the assembly of conventional torsional vibration apparatus takes up a substantial amount of time, and the same holds true for the installation of such apparatus in the power trains of motor vehicles or in other types of power trains wherein fluctuations of the rotational speed of a prime mover should not be transmitted to one or more driven units or wherein the amplitude of such fluctuations should be greatly reduced in order not to affect the operation and/or the useful life of the driven unit or units.

OBJECTS OF THE INVENTION

An object of the invention is to provide simple, compact and inexpensive torsional vibration damping apparatus which can be utilized in the power trains of motor vehicles or in other types of power trains as superior substitutes for heretofore known and used apparatus.

Another object of the invention is to provide a torsional vibration damping apparatus which comprises a small number of relatively simple parts.

A further object of the invention is to provide a torsional vibration damping apparatus which can be at least substantially completely assembled in the manufacturing plant to thus shorten the period of time which is required to install the apparatus in a power train, e.g., in an automobile assembly plant.

An additional object of the invention is to provide a novel and improved combination of rotary input and output components for use in the above-outlined torsional vibration damping apparatus.

Still another object of the invention is to provide a torsional vibration damping apparatus whose useful life is longer than that of heretofore known and utilized apparatus.

A further object of the invention is to provide a novel and improved combination of dampers for use in the above-outlined apparatus.

Another object of the invention is to provide a novel and improved combination of one or more dampers and one or more friction generating devices for use in the above outlined torsional vibration damping apparatus.

An additional object of the invention is to provide a highly reliable torsional vibration damping apparatus.

Still another object of the invention is to provide a novel and improved method of assembling the constituents of the above-outlined apparatus.

A further object of the invention is to provide a power train which embodies the above-outlined torsional vibration damping apparatus.

Another object of the invention is to provide a conveyance (such as a motor vehicle) which utilizes a power train embodying one or more torsional vibration damping apparatus of the above-outlined character.

An additional object of the invention is to provide novel and improved dampers for use in the above-outlined apparatus.

Still another object of the invention is to provide novel and improved input and output components for use in the dampers of torsional vibration damping apparatus.

A further object of the invention is to provide novel and improved resilient elements for use in the damper or dampers of the above-outlined torque transmitting apparatus.

Another object of the invention is to provide novel and improved connections between certain constituents of the above-outlined apparatus.

SUMMARY OF THE INVENTION

One feature of the instant invention resides in the provision of an apparatus which can be used to transmit torque and to damp vibrations of transmitted torque. The apparatus comprises at least one damper including at least one input component and at least one output component which is rotatable with and relative to the at least one input component about a common axis. The damper further comprises energy storing means (e.g., a set of straight or arcuate coil springs) interposed between the input and output components to yieldably oppose rotation of the input and output components relative to each other. At least one of the input and output components comprises at least one substantially disc-shaped torque transmitting member which is of one piece with a plurality of resilient portions deformable in the direction of the common axis and forming part of a friction generating device.

The at least one component can further comprise at least one second substantially disc-shaped torque transmitting member. Both members are made of sheet material, e.g., sheet steel.

At least some of the resilient portions can include elongated tongues, i.e., such tongues also form part of the at least one torque transmitting member. The tongues can extend substantially radially of the common axis of the input and output components. Alternatively, the tongues can extend in the circumferential direction of the at least one torque transmitting member or they can extend radially as well as circumferentially of such member. Each tongue can comprise a first portion which is of one piece with the at least one torque transmitting member and a friction generating second portion which is remote from the respective first portion. The at least one torque transmitting member can further comprise a substantially circular friction generating portion which connects the second portions of the tongues to each other.

At least one of the tongues can have a length which is between 2.5 and 8 times its width, preferably between about 3 and 5 times. Furthermore, the width of at least one tongue can be between about 2.5 and 8 times its thickness, preferably between about 3 and 5 times.

The at least one torque transmitting member can be provided with a substantially centrally located opening for a hub which forms part of one of the input and output components and is coaxial with such components.

The resilient portions of the at least one torque transmitting member can be maintained in direct frictional engagement with a metallic portion of the friction generating device. Alternatively, the resilient portions of the at least one torque transmitting member can be in direct frictional engagement with a friction ring of the friction generating device.

The at least one component of the damper can further comprise a second substantially disc-shaped torque transmitting member. The two members can be made of sheet material (such as sheet steel) and at least one of these members can be of one piece with projections which extend in the general direction of the common axis of the input and output components toward the other member. The at least one component can further comprise means for self-lockingly coupling the at least one torque transmitting member with the other torque transmitting member at a selected axial distance from each other. The coupling means can comprise a first detent provided on at least one of the projections and a complementary second detent on the other torque transmitting member.

The at least one component can constitute the input component of the damper and the at least one output component can comprise a substantially flange-like element which is disposed between the two torque transmitting members of the at least one input component, as seen in the direction of the common axis of the input and output components. The at least one output component can include a hub and a substantially flange-like element which surrounds the hub. Such apparatus can further comprise a second damper having coaxial input and output elements and the aforementioned torque transmitting members can form part of the at least one input component of the at least one damper. One of the detents can engage the other detent by snap action, i.e., one can establish a form-locking and/or force-locking connection between the torque transmitting members. The projections can be resiliently deformable in directions substantially radially of the common axis and the at least one projection can be configured to include an end portion remote from the at least one torque transmitting member. The first detent can include at least one undercut portion of the at least one projection adjacent the end portion of such projection and a portion of the second detent then engages the undercut portion of the first detent when the coupling between the two torque transmitting members is operative. The at least one undercut portion of the at least one projection can include a recess in an edge face of such projection. At least one of the projections can include means for non-rotatably fastening the at least one torque transmitting member to the other torque transmitting member. The projections can be at least substantially equidistant from each other as seen in the circumferential direction of the at least one torque transmitting member. The at least one and/or the other torque transmitting member can include at least one distancing element having means for maintaining such members at the selected distance from each other. The at least one distancing element can comprise a projection which is provided on the respective member of the at least one component. The at least one torque transmitting member can include a radially outer portion which is remote from the common axis of the input and output components, and the projections can be of one piece with such radially outer portion.

Windows which are provided in the at least one torque transmitting member for receiving the energy storing means can be obtained as a result of displacement of selected portions of sheet material of the at least one torque transmitting member, and at least one of the projections can form part of one of the selected portions.

Another feature of the invention resides in the provision of an apparatus which can be utilized to transmit torque and to damp vibrations of transmitted torque. The apparatus comprises at least one damper including input and output components which are rotatable with and relative to each other about a common axis, and energy storing means interposed between and serving to yieldably oppose rotation of the input and output components relative to each other. At least one of the input and output components includes at least one substantially disc-shaped torque transmitting member having at least two windows for the energy storing means and at least one prestressed tongue which serves to bias an element which is rotatable relative to the at least one torque transmitting member. The at least one tongue can directly abut the rotary element or the apparatus can further comprise a friction ring which is interposed between the at least one tongue and the rotary element. The at least one tongue can be installed in such a way that it is prestressed in the direction of the common axis of the input and output components. The windows are spaced apart from each other in the circumferential direction of the at least one torque transmitting member and the at least one tongue can extend substantially radially of the common axis between the windows as seen in the circumferential direction of the at least one torque transmitting member. The at least one torque transmitting member can be provided with a cutout which partially surrounds the at least one tongue. For example, the at least one torque transmitting member can be provided with a substantially U-shaped cutout for each of its windows. Each such cutout can have two legs extending substantially radially of the common axis of the input and output components and flanking the respective window, and each U-shaped cutout further comprises a web which connects the two legs to each other and is disposed between the common axis and the respective window. Alternatively, the at least one torque transmitting member can be provided with a cutout which communicates with one of the windows, which extends in the circumferential direction of the at least one torque transmitting member and which partially surrounds the at least one tongue. If the at least one torque transmitting member comprises a plurality of tongues, such tongues can include radially inner portions which are of one piece with a connecting portion of the at least one torque transmitting member. The connecting portion can constitute or form part of a substantially centrally located portion of the at least one torque transmitting member.

An additional feature of the invention resides in the provision of an apparatus which is utilized to transmit torque and to damp vibrations of transmitted torque. The apparatus comprises first and second dampers each including at least one input component and at least one output component, and the second damper further comprises a substantially disc-shaped torque transmitting spring disposed between the input and output components of the second damper and having resilient arms which are deformable in the circumferential direction of the second damper and are stressed in an axial direction of the second damper. The arms form part of a friction generating device having a frictional hysteresis which is a function of axial stressing of the arms. The spring can further comprise a substantially circular radially inner portion and the arms can extend from the inner portion substantially radially outwardly and in the circumferential direction of the second damper and can be resiliently deformable radially, circumferentially and axially of the inner portion of the spring. The output component of the second damper can include a hub which is surrounded by the inner portion of the spring. The arms can be connected to the input component of the second damper and can frictionally engage the input component or one of the input and output components of the first damper.

BRIEF DESCRIPTION OF THE DRAWINGS

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawings, wherein:

FIG. 3a is a fragmentary end elevational view of a modified coupling between the disc-shaped members of the input or output component of the primary damper;

FIG. 4 is a similar fragmentary end elevational view of a further coupling;

FIG. 5 is a fragmentary axial sectional view of a torsional vibration damping apparatus which constitutes a modification of the apparatus shown in FIG. 1;

FIG. 6 is a fragmentary sectional view of a further coupling;

FIG. 6a is a fragmentary end elevational view of still another coupling;

FIG. 7 is a plan view of a spring which can be utilized in a secondary damper of the improved torsional vibration damping apparatus;

FIG. 8 is an axial sectional view of a torsional vibration damping apparatus constituting a modification of the apparatus shown in FIGS. 1 and 5;

FIG. 9 is a plan view of a disc-shaped member which can be utilized in the input or output component of the improved apparatus; and FIG. 10 is a similar plan view of a modified disc-shaped member.

DESCRIPTION OF PREFERRED EMBODIMENTS

Figure 1:
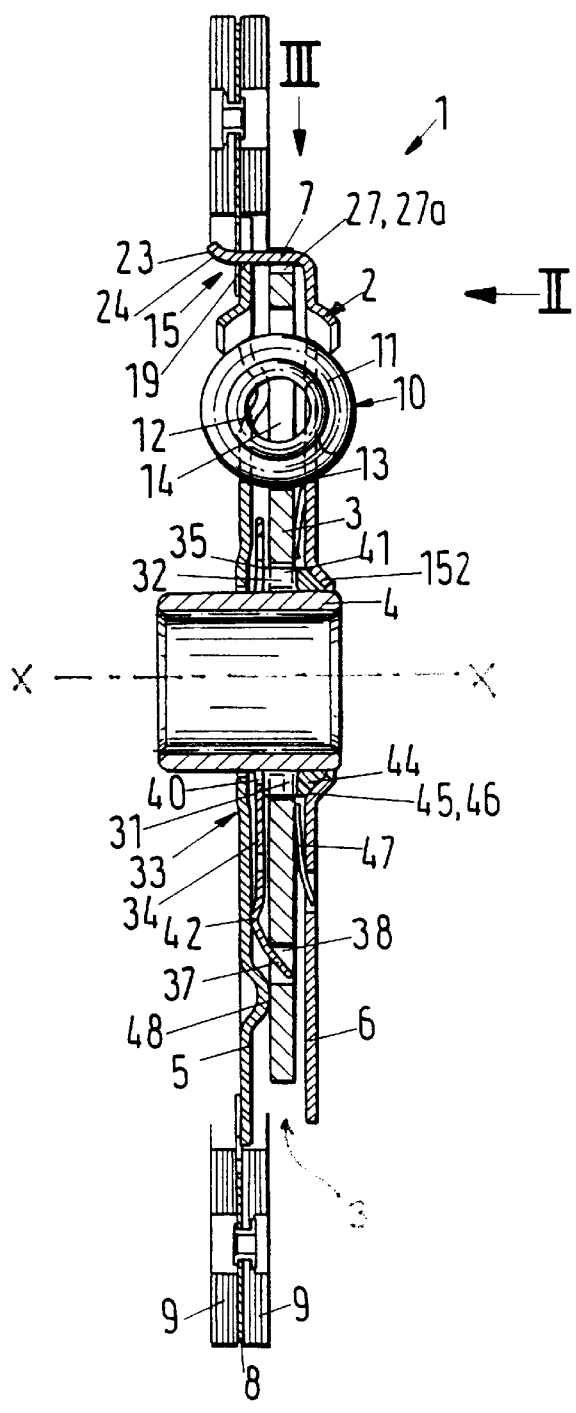
FIG. 1 is an axial sectional view of a torsional vibration damping apparatus which constitutes a clutch plate and embodies one form of the present invention.

FIG. 1 shows a portion of a torsional vibration damping and torque transmitting apparatus 1 which includes or constitutes a clutch disc or clutch plate for use between the axially movable spring-biased pressure plate and the counterpressure plate of a friction clutch. A friction clutch embodying the clutch plate of FIG. 1 can be utilized in the power train between a prime mover and one or more driven units, for example, between the rotary output element (such as a camshaft or a crankshaft) of a combustion engine and the input shaft of a variable-speed transmission in a motor vehicle.

The apparatus 1 comprises a first or primary damper 10 having an input component 2 and an output component 3. The two components are rotatable with and relative to each other about a common axis X—X. The damper 10 serves to transmit torque between a rotary output element (e.g., a crankshaft) and a rotary input element (e.g., the input shaft of a variable-speed transmission) when the prime mover for the output element is on. The input component 2 can be driven by way of an axially movable pressure plate and a counterpressure plate in a friction clutch which is engaged when the two plates bear against and transmit torque to the exposed sides of two sets of friction linings 9 forming part of the input component 2. A friction clutch which can utilize the apparatus of FIG. 1 as a clutch plate or clutch disc is disclosed, for example, in commonly owned U.S. Pat. No. 4,723,463 granted Feb. 9, 1988 to Wolfgang Reik et al. for "Assembly for Taking Up and Compensating For Torque-Induced Shocks". The disclosure of this patent is incorporated herein by reference.

The output component 3 of the apparatus 1 comprises an internally profiled sleeve-like hub 4 which can be non-rotatably mounted on the input shaft of a variable-speed transmission. For example, the internal surface of the hub can be provided with one or more axially parallel flutes which can receive one or more axially parallel external teeth on the input shaft of the transmission which receives torque from the output component 3 of the apparatus 1.

The input component 2 comprises two coaxial disc-shaped members 5, 6 which are spaced apart from each other in the direction of the axis X—X and surround the hub 4 of the output component 3. The disc-shaped members 5 and 6 (hereinafter called discs for short) are made of metallic sheet material. The disc 5 constitutes a carrier for a set of segments 8 which are riveted and/or otherwise connected to the aforementioned friction linings 9.

It is possible to make the segments 8 of one piece with the disc 5, i.e., to make the disc 5 larger in the radial direction of the axis X—X and to secure the friction linings 9 directly to the radially outermost portion of the thus enlarged disc 5. Reference may be had to German Pat. No. 886,694 which discloses a clutch plate wherein the friction linings are directly affixed to a relatively large disc-shaped carrier.

The output component 3 includes the aforementioned hub 4 and a substantially flange-like element 3a which is disposed between the discs 5, 6 of the input component 2 (as seen in the direction of the axis X—X) and constitutes the input element of a second or secondary or auxiliary damper 33 between the flange-like element 3a and the hub 4. The damper 10 includes energy storing means 11 comprising two or more straight or arcuate coil springs which are acted upon by the discs 5, 6 and act upon the element 3a of the output component 3 when the apparatus 1 is to transmit torque from a prime mover by way of the discs 5, 6, the springs of the energy storing means 11, the element 3a, the secondary damper 33 and the hub 4 (the latter of which constitutes the output element of the secondary damper 33).

Figure 2:
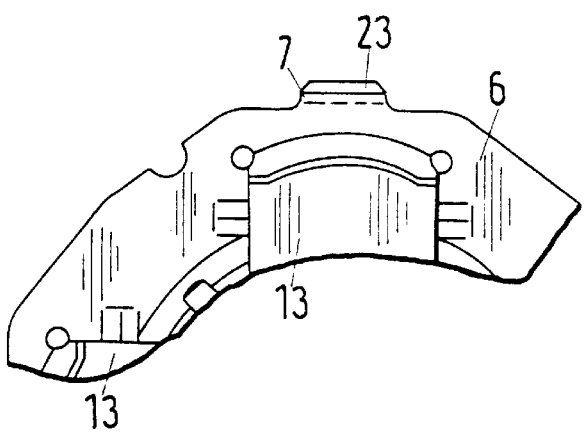
FIG. 2 is a fragmentary side elevational view of a disc-shaped member of the input component of a primary damper in the clutch plate as seen in the direction of arrow II in FIG. 1.

The coil springs of the illustrated energy storing means 11 are received in windows or cutouts 12, 13 and 14 which are respectively provided in the disc 5, in the disc 6 and in the element 3a. FIG. 2 shows two of the four equidistant windows 13 in the disc 6 of the input component 2 forming part of the apparatus 1 shown in FIG. 1. The number of windows 13 can be reduced or increased without departing from the spirit of the invention, and the same holds true for the windows 12 and 14 each of which is in requisite axial alignment with a window 13 in the starting angular positions of the discs 5, 6 and the element 3a relative to each other.

The secondary damper 33 constitutes a desirable but optional feature of the apparatus 1. If the damper 33 is omitted, the element 3a of the output component 3 is rigid (e.g., of one piece) with the hub 4. Reference may be had, for example, to German Pat. No. 897,783 which describes and shows a flange-like element which is rigid with a hub. German Pat. No. 25 08 878 and published German Patent Application No. 36 16 301 (as well as to the art which is mentioned in these publications) disclose that a secondary damper can be installed between a flange-like element and a hub to oppose angular displacements of such hub and the flange-like element relative to each other.

The radially outer portion of the disc 6 is of one piece with projections 7 in the form of lugs, each of which has a first end portion of one piece with the disc 6 and a second end portion 23 which is spaced apart from the general plane of the disc 6 (as seen in the direction of the axis X—X). The disc 6 can be made of one piece with two or more (e.g., four equidistant) projections 7, and each such projection can be disposed radially outwardly of a window 13. The material of the disc 6 (or at least the material of the projections 7) is selected in such a way that each projection is resiliently deformable in the radial direction of the axis X—X, namely that the second end portions 23 of the projections 7 can be moved radially outwardly but tend to move radially inwardly to positions at a selected radial distance from the axis X—X.

In accordance with a further feature of the invention, the damper 10 comprises a self-locking or automatic coupling 15 which can separably but reliably connect the discs 5, 6 to each other in such a way that the general planes of these discs are located at a selected axial distance from each other. The coupling 15 of FIG. 1 is designed in such a way that it can self-lockingly connect the discs 5, 6 to each other by snap action. The illustrated coupling 15 includes first detents 17 provided at the second end portions 23 of two or more projections 7 and an equal number of complementary or second detents 19 provided on the disc 5 adjacent the respective projections 7. Each detent 17 includes two substantially tangentially extending undercut portions 16 provided in the respective edge faces 18 of the corresponding projection 7 close to its second end portion 23, and each detent 19 includes a recess or cutout 20 receiving a neck portion between the undercut portions 16 in the edge faces 18 of the respective projection 7. The undercut portions 16 of the detent 17 are located in the plane of the disc 5, namely in a plane which is at least substantially normal to the common axis X—X of the discs 5, 6, i.e., of the input and output components 2, 3 of the damper 10.

The cutouts 20 of the detents 19 are open radially outwardly and the width of each cutout 20 matches or closely approximates the width 21 of the respective projection 7 between the confronting undercut portions 16. Therefore, when the coupling 15 is operative, i.e., when the detents 17 are in proper self-locking engagement with the respective detents 19, those projections 7 which are provided with detents 17 cooperate with the disc 5 to ensure that the discs 5 and 6 cannot turn relative to each other in the circumferential direction of the input component 2. In other words, the disc 5 can receive torque from the friction linings 9 and can transmit such torque to two or more projections 7 which, in turn, transmit torque to the disc 6. The latter cooperates with the disc 5 to cause the energy storing means 11 of the damper 10 to store energy, or to store additional energy, when the input component 2 is called upon to transmit torque to the output component 3 of the damper 10.

Figure 3:
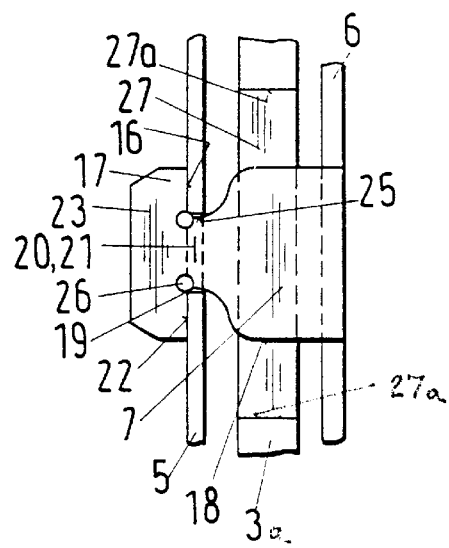
FIG. 3 is a fragmentary end elevational view substantially as seen in the direction of arrow III in FIG. 1 and shows the details of a coupling between the disc-shaped members of the input component forming part of the primary damper.

FIG. 3 shows that the difference between the width of the cutouts 20 in the disc 6 matches the width 21 of the respective detents 17 between the undercut portions 16 so that the projections 7 cooperate with the disc 5 to ensure that the disc 6 shares all angular movements of the disc 5 (clockwise and/or counterclockwise) without any or without any appreciable play. The reference character 22 denotes in FIG. 3 that side or surface of the disc 5 which bears against the adjacent surfaces in the undercut portions 16 of the detent 17.

The radially outer portion 23 of each projection 7, or of each projection having a detent 17, is curved radially outwardly (reference may be had to the upper portion of FIG. 1) so that its radially inner surface 24 constitutes a convex ramp which enables the side or surface 22 at the respective detent 19 to slide therealong by simultaneously flexing the projection 7 radially outwardly until the projection is free to snap radially inwardly and to thus couple the discs 5, 6 to one another at a selected axial distance from each other by the simple expedient of moving the disc 5 axially toward the disc 6 and/or vice versa. Snapping of the projections 7 to move their detents 17 into requisite engagement with the adjacent detents 19 of the disc 5 involves pivoting of the first end portions of the projections 7 relative to the adjacent radially outer portions of the disc 6. The projection 7 shown in FIG. 1 was free to pivot to the illustrated position (by turning in a counterclockwise direction) as soon as the distance between the discs 5 and 6 has been reduced to the selected value, i.e., as soon as the convex surface 24 of the end portion 23 has assumed a position to the left of the disc 5.

The distance between the edge faces 25 flanking the respective cutout 20 in the detent 19 of the disc 5 shown in FIG. 3 matches the width 20 of the projection 7 between the undercut portions 16 of the detent 17 to ensure that the transmission of torque between the discs 5 and 6 can take place without any play or without any noticeable play. The element 3a of the output component 3 is provided with peripheral cutouts or notches 27 for the respective projections 7. The distance between the edge faces 27a bounding the notches 27 (as seen in the circumferential direction of the disc 6) exceeds the width of the corresponding portion of a projection 7 so that the input component 2 and the output component 3 are free to perform certain angular movements relative to each other (against the opposition or under the bias of the energy storing means 11 of the damper 10). Thus, the edge faces 27a can be said to constitute means for limiting the extent of angular movability of the discs 5 and 6 on the one hand and the element 3a on the other hand relative to each other. FIG. 3 further shows that the width of the end portion 23 of the projection 7 considerably exceeds the distance 21 between the undercut portions 16 of the detent 17 so that the coupling 15 is highly unlikely to become disengaged. Disengagement would necessitate intentional pivoting of the projections 7 relative to the disc 5 in order to disengage the detents 17 from the detents 19.

Since the projections 7 tend to pivot in a direction to move their end portions 23 toward the axis X—X, they cooperate with the disc 5 to ensure that the discs 5 and 6 are accurately centered relative to each other, as long as the coupling 15 remains engaged.

FIG. 3 further shows that the detent 17 is provided with stress relieving holes 26 or analogous formations which serve the purpose of preventing the development of excessive (peak) stresses in the projections 7. The holes 26 which are shown in FIG. 3 are adjacent the edge faces 25 of the disc 5.

It is preferred to couple the discs 5, 6 of the input component 2 to each other in such a way that the discs tend to move axially and away from each other. This can be accomplished by the simple expedient of placing one or more springs between the discs 5, 6 and of installing such spring or springs in prestressed condition so that they tend to shift the disc 5 to the left and the disc 6 to the right of the axial position shown in FIG. 1. This ensures that the side 22 of the disc 5 bears against the adjacent surfaces in the undercut portions 16 of the detents 17. Such spring or springs cooperate with the pairs of properly engaged detents 17 and 19 to ensure that the discs 5 and 6 are invariably held at the selected axial distance from one another.

The aforementioned spring or springs need not react directly against one of the discs 5, 6 and/or bear directly against the other disc (6 or 5). Thus, it is also possible to install one or more springs between the element 3a of the output component 3 and the disc 5 or 6. Such spring or springs can constitute or form part of a friction generating device which yieldably opposes angular movements of the input and output components 2, 3 relative to each other and which assists the energy storing elements 11 of the damper 10. For example, it is possible to employ a diaphragm spring and to install the spring in the manner disclosed in some of the aforementioned patents and published patent applications. It is further within the purview of the invention to install one or more springs between the hub 4 and the disc 5 and/or 6 for the purpose of biasing the discs 5 and 6 axially of the hub and away from each other. Reference may be had, for example, to the published German Patent Application No. 43 04 778.

FIG. 3a shows a modified coupling between a projection 7 and the disc 5. Such a coupling also ensures that the axial distance between the disc 6 (not shown in FIG. 3a) and the disc 5 remains unchanged once the undercut portions 16a at the free end of the illustrated projection 7 receive the complementary portion of the detent on the disc 5. A coupling utilizing the structure of FIG. 3a can maintain the discs 5 and 6 at a selected axial distance from each other in such a way that the axial distance cannot be increased or decreased. Therefore, the aforementioned spring or springs which are or which can be used to urge the discs 5, 6 of the input component 2 shown in FIGS. 1 to 3 away from each other are not necessary.

The cutouts 20 of the detents 19 in the disc 5 alternate with the radially inner (root) portions of the friction linings 9 on the segments 8 which are affixed to the radially outer portion of the disc 5.

The extent of angular displacement of the discs 5, 6 of the input component 2 and the flange-like element 3a of the output component 3 relative to each other can be limited by the coil springs forming part of the energy storing means 11. Thus, the components 2, 3 cannot continue to turn relative to each other in a direction to cause the energy storing means 11 to store additional energy when the neighboring convolutions of each coil spring forming part of the energy storing means 11 abut each other, i.e., when the axial length of each coil spring is reduced to a minimum value so that each coil spring acts as a solid body. The aforediscussed edge faces 27a in the cutouts 27 of the flange-like element 3a constitute an additional means for limiting the extent of angular movability of the input and output components 2, 3 relative to each other in a direction to stress the coil springs of the energy storing means 11. The limiting means including the edge faces 27a in the cutouts 27 of the element 3a are optional.

FIGS. 1 to 3 and 3a illustrate two embodiments wherein the projections 7 are of one piece with the disc 6 and at least some of these projections carry detents engageable with the complementary detents 19 of the disc 5. The positions of the projections 7 (or at least of those projections 7 which carry detents 17 or equivalent coupling elements) can be reversed, i.e., such projections can be made of one piece with the disc 5 and the disc 5 is then provided with detents (corresponding to the detents 17) engageable with detents (corresponding to those shown at 19) on the disc 6. It is further possible to provide one or more projections 7 on the disc 6 and one or more projections on the disc 5. At least one projection on each of these discs is then provided with a detent corresponding to the detent 17 of FIG. 3, and each of the discs 5, 6 is then provided with at least one detent corresponding to the detent 19 of FIG. 3.

It is further possible to modify the apparatus of FIGS. 1 to 3 and/or the apparatus embodying the structure of FIG. 3a in such a way that the projections 7 merely serve to maintain the discs 5, 6 at a selected axial distance from each other, and to provide the disc 5 and/or 6 with one or more additional projections (such as the projection or lug 28 shown in FIG. 4) which serve to ensure that the disc 5 shares all angular movements of the disc 6 and vice versa. The coupling 29 including the structure shown in FIG. 4 (i.e., the coupling between the projection or lug 28 of the disc 6 (not shown in FIG. 4) and the disc 5) can be identical with or similar to the aforediscussed coupling 15, as long as it ensures that the projection or projections 28 compel the discs 5 and 6 to rotate as a unit.

Projections 28 of the type shown in FIG. 4 can be used in addition to or in lieu of projections 7, i.e., each projection 28 (or at least one projection 28) can be coupled to the disc 5 in such a way that it maintains the discs 5, 6 at a selected axial distance from each other as well as that it compels the two discs to rotate as a unit. If the projections 28 are used to maintain the discs 5 and 6 at a selected axial distance from each other or to ensure that the discs 5 and 6 rotate as a unit, the projection or projections 7 (on the disc 5 and/or on the disc 6) are used as a means for preventing angular movements of the discs 5, 6 relative to each other or as a means for maintaining the discs 5, 6 at a selected axial distance from each other. The projections 7 can be made of one piece with the disc 5 and/or 6, and the projections 28 can be made of one piece with the disc 6 and/or 5. In other words, all of the projections 7 and 28 can be provided only on the disc 5 or only on the disc 6, all of the projections 7 can be provided on the disc 5 and all of the projections 28 can be provided on the disc 6, all of the projections 7 can be provided on the disc 6 and all of the projections 28 can be provided on the disc 5, one or more projections 7 can be provided on the disc 5 and one or more projections 28 can be provided on the disc 6, or one or more projections 7 can be provided on the disc 6 and one or more projections 28 can be provided on the disc 5.

As can be seen in FIG. 5, at least one projection 7 or 28 can be provided on the disc 5 and can extend through and beyond the adjacent window 13 in the disc 6. The projection or lug 7 or 28 can constitute or form part of that portion of the sheet material of the disc 5 which is moved out of the general plane of the disc 5 in order to provide the window 12. Thus, the projection or projections 7 and/or 28 can be provided on one of the discs 5, 6 radially outwardly of the energy storing means 11 (i.e., radially outwardly of the windows 12 to 14) as shown in FIG. 1, or radially inwardly of the windows as shown in FIG. 5. Of course, it is equally possible to make the projections 7 and/or 28 of one piece with the disc 6, i.e., from the sheet material which is bent out of the general plane of the disc 6 in order to provide the windows 13. It is also possible to provide each of the discs 5, 6 with one or more projections 7 and/or 28 radially inwardly of the windows 12, 13 and with one or more projections 7 and/or 28 radially outwardly of such windows.

The projection 7 which is shown in FIG. 5 extends through the adjacent window 14 in the flange-like element 3a with requisite clearance to ensure that the discs 5, 6 and the element 3a can perform certain angular movements relative to each other (under or against the bias of the energy storing means 11).

FIG. 6 shows a portion of a projection 107 which can be utilized in lieu of a projection 7 or 28 and includes a detent 117a which resembles a hook with a pallet adapted to snap against the side or surface 22 of the disc 5 in order to prevent the discs 5 and 6 (the disc 6 is not shown in FIG. 6; it is assumed to be of one piece with the projection 107) from moving axially and away from each other. The pallet of the detent 117a has a surface 124 which serves as a ramp, i.e., which performs the same function as the surface 24 on the end portion 23 of the projection 7 shown in the upper portion of FIG. 1. Projections of the type shown in FIG. 6 can be provided on the disc 5 and/or 6 radially inwardly and/or radially outwardly of the energy storing means 11 (not shown in FIG. 6).

FIG. 6a shows a portion of a coupling 229 constituting a further modification of the heretofore described couplings (such as 15 and 29) and serving to maintain the discs 5, 6 at a selected axial distance from each other. The projection or lug 207 which is shown in FIG. 6a forms part of the disc 6 and is assumed to be located radially outwardly of the energy storing means 11 (not shown in FIG. 6a). The free end portion 223 of the projection 207 is provided with two undercut portions 216 which constitute notches in the respective edge faces 218 and are adjacent two edge faces 224 constituting ramps which facilitate forcible insertion of the end portion 223 into the cutout of the detent 219 on the disc 5. When the discs 5, 6 assume the positions shown in FIG. 6a, they are held against angular as well as against axial movement relative to one another. The projection 207 is resiliently deformable in the radial direction of the disc 6 (i.e., the left-hand end portion of the projection is pivotable relative to the adjacent portion of the radially outer part of the disc 6), and the detent 217 at the free end portion 223 of the projection 207 can be deformed in the circumferential direction of the disc 6. To this end, the projection 207 is provided with a substantially V-shaped centrally located slot 226 the width of which increases in a direction from the disc 6 toward the disc 5. This enables the two halves of the detent 217 to move toward each other during axial movement of the discs 5, 6 toward one another until the undercut portions 216 of the detent 217 move into the plane of the disc 5. The two halves of the end portion 223 of the projection 207 are then free to move away from one another in the circumferential direction of the disc 5 which results in engagement of the coupling 229, i.e., the discs 5, 6 are coupled to each other against angular and/or axial movement relative to one another.

The ramps 224 cooperate with the edge faces flanking the cutout of the detent 219 to compel the two halves of the end portion 223 of the detent 217 to move toward each other during engagement of the coupling 229. The slot 226 divides the projection 207 of FIG. 6a into two prongs which are mirror images of each other with reference to a plane which halves the slot 226, and each of these prongs can be pivoted relative to the disc 6 in two directions, namely to move the two halves of the split end portion 223 toward or away from each other as seen in the circumferential direction of the disc 6 as well as to move the two halves of the split end portion 223 toward or away from the common axis of the discs 5 and 6.

The width of the cutout forming part of the detent 219 on the disc 5 is preferably selected in such a way that the two prongs of the projection 207 tend to move their free ends away from each other in the circumferential direction of the disc 5 while the coupling 229 is fully engaged. This ensures that the prongs of the projection 207 bear against the adjacent edge faces of the disc 5 in the cutout of the detent 219. The cutout of the detent 219 can constitute a hole or slot which is completely surrounded by the material of the disc 5, or a recess which extends radially inwardly from the peripheral surface of the disc 5. The reason that the cutout of the detent 219 can constitute a hole or slot which is completely surrounded by the material of the disc 5 is that the two halves or prongs of the projection 207 can move their free ends toward each other during movement of the ramps 224 along the adjacent surfaces bounding such hole or slot, i.e., the coupling 229 can be engaged without necessitating any pivoting of the prongs of the detent 217 in directions to move the free ends of the prongs toward or away from the common axis of the discs 5 and 6.

To summarize, the basic feature of the improved input component 2 of the damper 10 is that the coupling 15 or 29 or 229 (or an equivalent self-locking or automatic coupling) establishes a reliable connection between the discs 5, 6 by the simple expedient of moving the discs axially and toward each other to thus automatically engage the coupling. The thus engaged coupling can be designed to maintain the discs 5, 6 against angular and/or axial movement relative to each other, at least against movement in the direction of the common axis of such discs. All that is necessary is to provide one, two or more pairs or sets of complementary detents (such as 17 and 19), one set on the disc 5 and the other set on the disc 6.

An advantage of the aforedescribed couplings is that their engagement does not necessitate any permanent (plastic) deformation of the disc 5 and/or 6 and/or of the projections (such as 7 and/or 28) in order to engage the coupling or to maintain the coupling in the engaged condition. This simplifies the assembly of the input component 2 and enhances the reliability of such an input component. Furthermore, the manufacturing cost of the input component 2 and of the entire damper utilizing such input component is much less than the cost of heretofore known and used components which are employed in dampers of clutch plates or other torsional vibration damping apparatus in motor vehicles or elsewhere. For example, the assembly line which is set up to assemble the component parts of the improved torsional vibration damping apparatus need not be equipped with riveting, upsetting and/or like machines which are used to ensure reliable assembly of input and/or output components forming part of heretofore known dampers wherein at least one of the input and output components must be assembled of several separately produced parts which are to be maintained at a selected distance from one another.

The feature that the complementary detents of the discs 5 and 6 need not be permanently deformed in order to be capable of maintaining the discs at a desired axial distance and/or of preventing angular movements of the discs relative to one another brings about the additional advantage that each of the discs 5, 6 can be hardened in its entirety. For example, the disc 5 and/or the disc 6 can be case hardened prior to being coupled to the other disc. Such hardening of the entire separately produced parts of heretofore known composite input and/or output components in dampers for use in clutch plates or the like is not possible because hardening of those portions, which must be plastically deformed in order to establish reliable connections between the separately produced parts of conventional composite input and/or output components, would entail the development of cracks or complete breaks in the course of the plasticizing operation. Therefore, the separately produced parts of the input and/or output components of conventional dampers cannot be hardened prior to assembly (i.e., prior to plastic deformation) or, if they have undergone a hardening treatment, they must be soft annealed preparatory to plastic deformation. If the separately produced parts of heretofore known input and/or output components are case hardened, it is necessary to prevent carburizing of those portions which are to undergo a plasticizing operation (i.e., permanent deformation) in order to be adequately coupled to each other.

It is further clear that the aforedescribed invention can be embodied in dampers for installation in clutch plates and/or other torsional vibration damping apparatus for use in automotive vehicles as well as in numerous other dampers or analogous devices wherein discs or similar parts made of suitable metallic or other sheet material are to be coupled to maintain them at a desired distance from each other and/or to prevent other movements of such parts relative to one another. For example, form-locking coupling connections of the type described with reference to FIGS. 1 to 6a can be employed with advantage in devices or apparatus of the type disclosed in British Pat. No. 1,492,982, in European Pat. No. 0 200 633 or in published French Patent Application No. 2 411 999.

Referring again to FIG. 1, the hub 4 of the output component 3 of the apparatus 1 is provided with an external profile 31 mating with an internal profile 32 of the element 3a. The profile 31 can include an annulus of external teeth and the profile 32 can include an annulus of internal teeth. The teeth of the profiles 31, 32 are dimensioned in such a way that the element 3a and the hub 4 have a predetermined freedom of angular movement relative to each other. Such angular movement is opposed by the secondary coupling 33. As concerns the provision of mating teeth between a hub and a disc-shaped or flange-like element to permit some angular displacements of the internally toothed and externally toothed parts relative to each other, reference may be had to the published German Patent Application No. 28 14 240 and/or to certain of the previously mentioned patents and/or published patent applications.

The secondary damper 33 of FIG. 1 comprises a resilient element 34 which opposes angular movements of the element 3a and the hub 4 relative to each other. The illustrated resilient element 34 is a spring which is made of metallic sheet material and can be configurated in a manner as shown in FIG. 7. Thus, the spring 34 comprises a radially inner portion 35 which can be said to constitute a flat internal gear having teeth 39 in mesh with the external teeth of the profile 31 on the hub 4. The teeth 39 ensure that the radially inner portion 35 of the spring 34 and the hub 4 cannot perform any angular movements relative to each other. The spring 34 further comprises arcuate arms 36 (FIG. 7 shows two such arms) which extend circumferentially of the central portion 35 and can undergo elastic deformation. The arms 36 have free end portions 37 which are spaced apart from the central portion 35, as seen in the radial direction of the spring 34, and serve to couple the spring with the flange-like element 3a of the output component 3. The end portions 37 of the arms 36 extend substantially radially outwardly and away from the central portion 35 and resemble tongues which are preferably inclined relative to the axis of the spring 34, i.e., they are bent out of the general plane of the central portion 35 of the spring (reference may be had to FIG. 1).

It is also possible to bend the free end portions 37 of the arms 36 in such a way that they extend in the axial direction of the spring 34, i.e., at least substantially at right angles to the plane of FIG. 7. In other words, the free end portion 37 shown in the lower part of FIG. 1 can be bent to such an extent that it extends in at least substantial parallelism with the axis X—X. Each end portion 37 extends into an adjacent socket 38 (e.g., a through hole) of the element 3a.

The externally profiled portion 31 of the hub 4 includes a first section 40 whose teeth mate (without any or without any appreciable play) with the internal teeth 39 of the central or main portion 35 of the spring 34. Another section 41 of the profile 31 has teeth which mate (with the aforediscussed play) with the teeth forming part of or constituting the internal profile 32 of the element 3a. The profile 31 of the hub 4 further includes an annular shoulder which is disposed between the toothed sections 40, 41 and serves as an axial abutment for the central portion 35 of the spring 34.

The spring 34 is or can be made of relatively thin resilient metallic sheet material and its arms 36 are preferably inclined relative to the plane of the central portion 35 so that the thus inclined arms resemble portions of helices extending axially as well as circumferentially of, as well as radially outwardly from, the central portion 35. Thus, the arms 36 can resemble ramps having a helical shape prior to installation of the spring 34 between the element 3a and the hub 4 of the output component 3. When the spring 34 is properly installed, the arms 36 are elastically deformed in the direction of the axis X—X so that their free end portions 37 are moved closer to or actually into the general plane of the central portion 35. The arms 36 of the properly installed spring 34 can be said to (indirectly) react against the shoulder between the toothed sections 40, 41 of the profile 31 on the hub 4 (the central portion 35 bears against such shoulder) and their free end portions 37 bear against the disc 5. The end portions 37 of the arms 36 can be provided with corrugations 42 or similar configurations which contact the adjacent side of the disc 5 to thus ensure that the arms 36 are maintained in axially stressed condition between the disc 5 and the aforementioned shoulder forming part of the external profile 31 on the hub 4. Such axial stressing of the arms 36 ensures that the central portion 35 of the spring 4 bears against the shoulder between the toothed sections 40, 41 of the profile 31 at the exterior of the hub 4.

FIG. 7 further shows (by phantom lines) an annular connector or connection 43 which is disposed radially outwardly of the central or main portion 35 and connects the end portions 37 of the arms 36 to each other.

It is clear that the spring 34 of FIGS. 1 and 7 can be replaced with a spring having three or more arms each of which has a free end portion bearing against the disc 5 when the secondary damper 33 is properly installed between the hub 4 and the element 3a of the output component 3.

The properly installed spring 34 reacts against the shoulder of the hub 4 and bears against the disc 5 in a direction to urge it to the left, as viewed in FIG. 1. Since the coupling 15 compels the disc 6 to share the axial movements of the disc 5, the disc 6 is also urged in a direction to the left (as viewed in FIG. 1) and its radially innermost annular portion 152 is caused to bear against a friction ring 44 which surrounds the hub 4 between the element 3a and the disc 6. Thus, the radially innermost portion 152 forms part of a friction generating device which further includes the friction ring 44. The latter has a conical surface 45 confronting the portion 152 which has a complementary conical surface 46 contacting the conical surface 45. The friction ring 44 is centered by the hub 4 and is urged (by the spring 34 through the medium of the disc 5, coupling 15 and disc 6) toward an adjacent shoulder forming part of the profile 31 on the hub to the right of the toothed section 40.

The conical surfaces 45, 46 cooperate to urge the friction ring 44 against the adjacent shoulder of the profile 31 as well as to prevent undesirable radial movements of the disc 5 and/or 6 (and/or of parts carried by these discs) relative to the hub 4, i.e., at right angles to the axis X—X. Such centering action of the spring 34 in cooperation with the friction generating device 44, 152 is particularly important when the friction clutch utilizing the clutch plate 1 of FIG. 1 is disengaged, i.e., when the friction linings 9 are not engaged by the pressure plate and the counterpressure plate of the friction clutch so that such plates can turn relative to the input component 2 including the discs 5, 6 and the coupling 15. The properly centered input component 2 ensures that the disc 5 is accurately centered relative to the hub 4.

The friction ring 44 can be omitted if the hub 4 is configured to provide a conical surface corresponding to the conical surface 45 and is acted upon by the complementary conical surface 46 of the radially innermost portion 152 of the disc 6. This establishes a metal-to-metal frictional engagement between the hub 4 and the disc 6. Such disc and the hub can be made of steel, the same as the disc 5 and the element 3a.

FIG. 1 further shows an energy storing member 47 (e.g., a diaphragm spring) which is installed, in axially stressed condition, between the element 3a and the disc 6 so that it biases the element 3a in the direction of the axis X—X toward the disc 5. The disc 5 is provided with corrugations 48 or similar raised portions (one shown in the lower part of FIG. 1) which are directly contacted by the adjacent side of the element 3a under the bias of the diaphragm spring 47. The corrugations 48 can be made at the time the disc 5 is cut out from a sheet metal blank in a stamping, upsetting or other suitable machine.

The corrugations 48 of the disc 5, the diaphragm spring 47 and those portions of the element 3a which bear upon the corrugations 48 can be said to constitute a further friction generating device in which the element 3a is in metal-to-metal (e.g., steel-to-steel) contact with the disc 5.

The mode of operation of the improved apparatus 1 will be readily understood upon perusal of the preceding parts of this specification. Reference may also be had to some of the previously mentioned patents and published patent applications which disclose a clutch plate or another torsional vibration damping apparatus with two dampers. The damper 10 yieldably opposes angular movements of the discs 5, 6 and flange-like element 3a relative to each other, and the secondary damper 33 yieldably opposes angular movements of the element 3a and the hub 4 relative to each other.

It is equally within the purview of the invention to equip the vibration damping apparatus 1 with one or more friction generating devices which operate in parallel with the first or primary damper 10 and/or in parallel with the secondary damper 33 by utilizing one or more springs constituting integral parts of the disc 5 and/or 6 and acting in the direction of the axis X—X to bias one or more parts of the input component 2 against one or more parts of the output component or to yieldably oppose angular movements of the element 3a and hub 4 relative to each other in addition to that opposition which is offered by the spring 34. Referring to FIG. 8, the character 49 denotes one of a plurality of resilient portions in the form of lugs or tongues bent out of the main plane of the disc 6 and frictionally engaging the adjacent side of the flange-like element 3a of the output component 3. The resilient portions 49 of the disc 6 extend in the circumferential direction of the input and output components and are disposed radially inwardly of the energy storing means 11 of the damper 10. Such resilient portions can yield in the direction of the common axis of the discs 5, 6 and element 3a. When the disc 6 is yet to be coupled to the disc 5, the resilient portions 49 can extend from the general plane of the disc 6 at an angle of close to 90° to be thereupon flexed toward the general plane of the disc 6 when the coupling of such disc with the disc 5 is completed and the flange-like element 3a of the output component 3 is located between the discs 5 and 6. The resilient portions 49 then bear against the element 3 and establish a friction generating device which opposes angular movements of the disc 6 and element 3a relative to each other. Thus, the resilient portions 49 constitute functional equivalents of the diaphragm spring 47 in the apparatus 1 of FIG. 1. The length, thickness and/or width of the resilient portions 49 can be selected in such a way that the frictional hysteresis that develops is best suited for the application of the apparatus 1 which embodies the structure of FIG. 8.

The disc 5 can also include tongue-like or similar resilient portions corresponding to the resilient portions 49 of the disc 6. Such resilient portions can be provided in parts corresponding to the discs 5, 6 and/or similar or analogous parts which are used in clutch plates or similar apparatus to form part of or to constitute input or output components, especially in clutch plates or analogous apparatus which embody at least one hysteretic unit in the form of a friction generating device or the like.

FIG. 9 shows a disc 106 which can be utilized in the torsional vibration damping apparatus of FIG. 1, 5 or 8 as well as in many other types of clutch plates or the like. The disc 106 has four equidistant windows 113 for reception of coil springs, such as the coil springs of the energy storing means 11 acting in the circumferential direction of the input and output components. The main portion of the disc 106 is further provided with substantially U-shaped cutouts 151 each of which spacedly surrounds the radially inner portion as well as the substantially radially extending lateral portions of the adjacent window 113. It can be said that each U-shaped slot 151 includes two substantially radially extending legs each of which is located between two neighboring windows 113, and a substantially circumferentially extending web which communicatively connects the respective radially extending legs and is located between the respective window 113 and the annular central or main portion 152 of the disc 106. The radially extending legs of neighboring U-shaped cutouts 151 flank radially extending portions or prongs 149 having radially inner portions of one piece with the central portion 152 and radially outer portions spaced apart from the periphery of the disc 106. The prongs 149 constitute resiliently deformable portions of the disc 106 and can urge the central or main portion 152 axially toward an adjacent part, e.g., against the flange-like element 3a of the output component of a clutch plate which employs the disc 106 of FIG. 9.

The central portion 152 can bear directly against the adjacent part (such as an element 3a) or indirectly through the medium of a suitable friction ring. Alternatively, and as shown in FIG. 8, the central portion 152 of a disc (such as the disc 6) can bear directly against a complementary portion of a part (hub 104) which can turn relative to the portion 152. FIGS. 1 and 5 show that the central portion 152 of the disc 6 bears against the aforediscussed friction ring 44 which, in turn, bears against a radially outwardly extending portion (e.g., shoulder) of the hub 4, i.e., of a part which has limited freedom of angular movement relative to the disc 6. As clearly shown in FIGS. 1, 5 and 8, the radially inner or central portion 152 of the disc 6 or 106 can be provided with a conical surface (46 in FIG. 1) which is in frictional engagement with the adjacent conical surface 45 of the friction ring 44 or in direct frictional engagement with the adjacent portion of the hub 104 (FIG. 8). However, it is equally within the purview of the invention to provide the disc 6 or 106 with a main or central portion 152 located in a plane which is at least substantially normal to the common axis of the discs 5, 6 or 5, 106. It is advisable to provide the radially inner central or main portion 152 with a convex frustoconical surface, particularly if the main or central portion 152 is to be maintained in direct metal-to-metal engagement with an adjacent part which rotates relative to the disc 6 or 106 (refer again to FIG. 8 which shows that the slightly convex frustoconical side or surface of the portion 152 is in direct contact with the metallic hub 104). This enhances the centering action of the friction ring 44 or the centering action of that part of the hub 104 in FIG. 8 which is contacted by the central portion 152 of the disc 6. Furthermore, such configuration of the portion 152 ensures the establishment of a frictional engagement which remains at least substantially constant during the entire life of the torsional vibration damping apparatus.

The nature of contact of the central or main portion 152 of a disc 6 or 106 with the adjacent part (such as the friction ring 44 or the hub 4) which can rotate relative thereto can be similar to that between the corrugations 42 of the end portions 37 of arms 36 of the spring 34 and the adjacent side of the disc 5 or between the corrugations 48 of the disc 5 and the element 3a in the apparatus 1 of FIG. 1.

The disc 106 of FIG. 9 is provided with four equidistant radially extending resiliently deformable portions or prongs 149. It is equally possible to increase or to reduce the number of such prongs, depending on the number of coil springs which form part of the energy storing means 11 (i.e., on the number of windows 113 in the disc 106). It is presently preferred to provide the disc 106 with at least two portions or prongs 149 which are or which can be disposed diametrically opposite each other.

FIG. 10 shows a further disc 206 having four equidistant windows 213 each of which can receive at least a portion of at least one coil spring forming part of energy storing means in a first or primary damper corresponding to the damper 10 in the apparatus 1 of FIG. 1. The body of the disc 206 is further provided with cutouts 251 and 251a. Each of the cutouts 251, 251a communicates with a discrete window 213. Each pair of neighboring cutouts 251, 251a flanks a resilient portion or prong 249 which extends in the circumferential direction of the disc 206 and establishes an axially yieldable connection between the main or central portion 252 and the peripheral portion of the disc 206. The configuration of the main or central portion 252 can be similar to that of the central portion 152 of the disc 106 shown in FIG. 9 or of the ring 6 shown in FIGS. 1 and 5.

Each cutout 251 communicates with the radially inner portion and each cutout 251a communicates with a lateral portion of the respective window 213. The portions or prongs 249 of the disc 206 are located radially inwardly of the respective windows 213, i.e., radially inwardly of the springs forming part of the energy storing means of the first or primary damper.

As described with reference to FIGS. 1 to 10, the resilient portions or tongues or prongs 49, 149 or 249 can be provided on and can be one piece with the disc 6, 106 or 206. However, it is equally possible to provide such resilient portions on the disc 5 or any one of a plurality of rotary members or elements which can turn relative to each other and can be used to transmit torque in a clutch plate or an analogous torsional vibration damping apparatus.

Referring again to FIG. 8, the external surface of the hub 104 is provided with two axially spaced apart grooves 150 one of which is outwardly adjacent the radially innermost portion or central portion of the disc 5 and the other of which is outwardly adjacent the radially innermost or central portion 152 of the disc 6. Such grooves serve as barriers or intercepting means for a lubricant (such as oil or grease) which tends to flow along the external surface of the hub 104 toward and into the space disposed between the discs 5, 6 and accommodating the element 3a of the output component 3 of the apparatus 1. It is particularly desirable to prevent a lubricant from reaching the damper or dampers of the apparatus 1 and/or the friction generating device or devices which cooperate with the damper or dampers to yieldably oppose angular movements of the input and output components relative to each other. Otherwise stated, the grooves 150 intercept lubricant which could adversely affect the frictional hysteresis of one or more units wherein two neighboring members or elements are in direct metal-to-metal (e.g., steel-to-steel) contact with one another. By keeping the lubricant away from such units, the grooves 150 ensure that the friction coefficients of the parts which are in sliding contact with each other remain at least substantially constant. Direct frictional engagement between metallic parts which are turnable and/or otherwise movable relative to each other can be further enhanced by providing the contact surface(s) of one or both parts with a phosphate layer and/or with a layer consisting of or containing rust powder.

The improved apparatus can be modified in a number of additional ways without departing from the spirit of the present invention. For example, the features of the apparatus 1 shown in FIGS. 1 to 3 can be combined with those of the apparatus of FIG. 5 and/or 8, and the features of the apparatus of FIG. 5 can be combined with those of the apparatus shown in FIG. 8. Furthermore, certain constituents of the apparatus which are shown in FIGS. 1 to 10 can be combined with those of the apparatus described and shown in the aforediscussed patents and published patent applications. Still further, at least some of the parts in the apparatus of FIGS. 1 to 10 are deemed to be patentable per se.

The dampers 10 and 33 of the improved torsional vibration damping apparatus can be said to constitute a composite damper or idling damper wherein a first part (3a) of the output component (3a, 4) of the first damper (10) constitutes the input element or input component of the secondary or auxiliary damper (33) and a second part (4) of the primary damper constitutes the output element or output component of the secondary damper.

The detent or detents on at least one of the discs which are secured to each other by the coupling 15, 29 or 229 (or an analogous self-locking coupling) can also be modified in a number of additional ways. By way of example, only one edge face 18 of the projection 7 shown in FIG. 3 need be provided with an undercut portion 16 if the coupling 15 shown in FIGS. 1 to 3 is required to merely ensure that the two coupled-together disc-shaped members (such as 5 and 6) are to transmit torque in a single direction. The illustrated embodiment (wherein each of the two edge faces 18 of the projection 7 are provided with undercut portions 16) is preferred at this time because such projection cooperates with the disc 5 to prevent any angular (i.e., clockwise and counterclockwise) movements of the discs 5 and 6 relative to each other. In other words, the projections 7 and/or 28 can serve to transmit the entire torque from the friction linings 9 to the hub 4 or 104.

As already mentioned above, the frictional hysteresis of a friction generating device in the apparatus of the present invention can be selected for a specific utilization of the apparatus by determining the nature and the extent of frictional engagement between the relatively movable (rotatable) constituents of a friction generating device. For example, the length of the arms 36 and/or prongs 49, 149 or 249 forming part of the spring 34 and/or of the discs 6, 106 or 206 can be between 2.5 and 8 times the width of the arms or prongs, preferably between 3 and 5 times. Furthermore, the width of an arm or prong (or an analogous part forming part of a friction generating device) can be between 2.5 and 8 times (preferably between about 3 and 5 times) the thickness of the respective arm or prong.

An advantage of disc-shaped members (such as 6, 106 or 206) which are of one piece with resiliently deformable portions in the form of tongues, lugs, prongs or the like (such as the portions 49, 149 and 249) is that the disc-shaped members can perform plural functions, i.e., transmitting torque from the friction linings 9 to the output element 3 as well as forming part of friction generating devices operating in parallel with the primary damper of torsional vibration damping apparatus.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. Apparatus for transmitting torque and for damping vibrations of transmitted torque, comprising: at least one damper including at least one input component and at least one output component rotatable with and relative to said input component about a common axis; and energy storing means interposed between said input and output components for yieldably opposing rotation of said input and output components relative to each other, at least one of said components including at least one substantially disc-shaped torque transmitting member of sheet material, said member being of one piece with a first end of each of a plurality of elongated resilient portions which are deformable in the direction of said common axis and form part of a friction generating device, said resilient portions having second ends and said at least one component further including portions extending substantially in a circumferential direction of said member and each connecting the second end of one of said resilient portions with the second end of at least one other resilient portion.

2. The apparatus of claim 1, wherein said at least one component further comprises at least one second substantially disc-shaped torque transmitting member of sheet material.

3. The apparatus of claim 1, wherein at least one of said elongated resilient portions includes tongue.

4. The apparatus of claim 1, wherein said resilient portions extend substantially radially of said common axis.

5. The apparatus of claim 1, wherein said resilient portions extend in a circumferential direction of said at least one torque transmitting member.

6. The apparatus of claim 1, wherein each of said second ends is a friction generating second end spaced apart from the respective first end.

7. The apparatus of claim 6, wherein said connecting portions form part of a circular friction generating portion of said at least one component.

8. The apparatus of claim 1, wherein said at least one of said resilient portions has a length between 2.5 and 8 times a width thereof.

9. The apparatus of claim 8, wherein said length is between 3 and 5 times said width.

10. The apparatus of claim 1, wherein at least one of said resilient portions has a width between about 2.5 and 8 times a thickness thereof.

11. The apparatus of claim 10, wherein said width is between about 3 and 5 times said thickness.

12. The apparatus of claim 1, wherein said at least one torque transmitting member defines a substantially centrally located opening for a hub forming part of one of said input and output components, and is coaxial with said components.

13. The apparatus of claim 1, wherein said resilient portions are in direct frictional engagement with a metallic portion of said friction generating device.

14. The apparatus of claim 1, wherein said resilient portions are in direct frictional engagement with a friction ring of said friction generating device.

15. The apparatus of claim 1, wherein said at least one component further includes a second substantially disc-shaped torque transmitting member, said second member consisting of sheet material and at least one of said members being of one piece with projections extending in a general direction of said common axis toward the other of said members, said at least one component further including means for self-lockingly coupling said at least one member with said other member at a selected axial distance from each other, said coupling means comprising a first detent provided on at least one of said projections and a complementary second detent on said other member.

16. The apparatus of claim 15, wherein said at least one component is said at least one input component.

17. The apparatus of claim 16, wherein said at least one output component comprises a substantially flange-like element disposed between said members of said at least one input component.

18. The apparatus of claim 15, wherein said at least one output component includes a hub and a substantially flange-like element surrounding said hub.

19. The apparatus of claim 15, further comprising a second damper having coaxial input and output elements, said members forming part of said at least one input component and one of said detents engaging the other of said detents by snap action.

20. The apparatus of claim 15, wherein said projections are resiliently deformable in directions substantially radially of said common axis.

21. The apparatus of claim 15, wherein said at least one projection includes an end portion spaced apart from said at least one member and said first detent includes at least one undercut portion of said at least one projection adjacent said end portion, said second detent including a portion engaging said undercut portion.

22. The apparatus of claim 21, wherein said at least one projection has an edge face and said at least one undercut portion includes a recess in said edge face.

23. The apparatus of claim 15, wherein at least one of said projections includes means for non-rotatably fastening said at least one torque transmitting member to said other torque transmitting member.

24. The apparatus of claim 15, wherein said projections are at least substantially equidistant from each other as seen in a circumferential direction of said at least one torque transmitting member.

25. The apparatus of claim 15, wherein at least one of said at least one member and said other member includes at least one distancing element having means for maintaining said at least one member and said other member at said selected distance from each other.

26. The apparatus of claim 25, wherein said at least one distancing element comprises a projection provided on the respective member of said at least one component.

27. The apparatus of claim 15, wherein said at least one torque transmitting member includes a radially outer portion spaced apart from said common axis, said projections being of one piece with said radially outer portion.

28. The apparatus of claim 15, wherein said at least one torque transmitting member has windows for said energy storing means, said windows being formed as a result of displacement of selected portions of sheet material of said at least one member, at least one of said projections forming part of one of said selected portions.

29. Apparatus for transmitting torque and for damping vibrations of transmitted torque, comprising: at least one damper including input and output components rotatable with and relative to each other about a common axis, and energy storing means interposed between and arranged to yieldably oppose rotation of said components relative to each other, at least one of said components including at least one substantially disc-shaped torque transmitting member having at least two windows for said energy storing means and at least two prestressed tongues arranged to bias an element which is rotatable relative to said at least one torque transmitting member, said tongues being spaced apart from each other in a circumferential direction of said at least one member and said at least one member having a radially inner portion connecting said tongues with each other.

30. The apparatus of claim 29, wherein at least one of said tongues directly abuts said element.

31. The apparatus of claim 29, further comprising a friction ring between at least one of said tongues and said element.

32. The apparatus of claim 29, wherein said tongues are prestressed in the direction of said common axis.

33. The apparatus of claim 29, wherein said at least two windows are spaced apart from each other in said circumferential direction of said at least one torque transmitting member and at least one of said tongues extends substantially radially of said common axis between said windows as seen in said circumferential direction.

34. The apparatus of claim 29, wherein said at least one torque transmitting member has a cutout partially surrounding at least one of said tongues.

35. The apparatus of claim 29, wherein said at least one torque transmitting member has a substantially U-shaped cutout for each of said windows, each cutout having two legs extending substantially radially of said common axis and flanking the respective window and each of said cutouts further having a web between said common axis and the respective window.

36. The apparatus of claim 29, wherein said at least one torque transmitting member has a cutout communicating with one of said at least two windows, extending in a circumferential direction of said at least one member and partially surrounding at least one of said tongues.

37. The apparatus of claim 29, wherein said tongues have radially inner portions and said at least one connecting portion is of one piece with the radially inner portions of said tongues.

38. The apparatus of claim 37, wherein said connecting portion is a centrally located portion of said at least one torque transmitting member.

39. Apparatus for transmitting torque and for damping vibrations of transmitted torque, comprising first and second dampers each including at least one input component and at least one output component, each of said components of said first damper comprising a disc-shaped element, said second damper further comprising a substantially disc-shaped torque transmitting spring disposed axially between the disc-shaped elements of the first damper and having resilient arms deformable in a circumferential direction of said second damper and being stressed in an axial direction of said second damper, said arms forming part of a friction generating device having a frictional hysteresis which is a function of axial stressing of said arms, said arms comprising portions abutting one of said disc-shaped elements of said first damper due to said stressing in said axial direction and being non-rotatably connected with the other disc-shaped element of said first damper.

40. The apparatus of claim 39, wherein said spring includes a substantially circular radially inner portion and said arms extend from said inner portion substantially radially outwardly and in said circumferential direction, and being resiliently deformable radially, circumferentially and axially of said inner portion.

41. The apparatus of claim 40, wherein the output component of said second damper includes a hub and said inner portion of said spring surrounds said hub, said arms being connected to the input component of said second damper and frictionally engaging the input component of said first damper.

* * * * *